(12) United States Patent
Nitta

(10) Patent No.: US 8,011,334 B2
(45) Date of Patent: Sep. 6, 2011

(54) EXHAUST VALVE CONTROL METHOD AND EXHAUST VALVE CONTROL DEVICE FOR DIESEL ENGINE

(75) Inventor: Junichiro Nitta, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 412 days.

(21) Appl. No.: 11/815,371

(22) PCT Filed: Jan. 17, 2006

(86) PCT No.: PCT/JP2006/300498
§ 371 (c)(1),
(2), (4) Date: Aug. 2, 2007

(87) PCT Pub. No.: WO2006/082704
PCT Pub. Date: Aug. 10, 2006

(65) Prior Publication Data
US 2009/0018747 A1 Jan. 15, 2009

(30) Foreign Application Priority Data
Feb. 4, 2005 (JP) .................................. 2005-028827

(51) Int. Cl.
*F01L 1/34* (2006.01)
(52) U.S. Cl. .................... 123/90.15; 123/90.17; 123/347
(58) Field of Classification Search .............. 123/90.15, 123/90.16, 90.17, 90.18, 347
See application file for complete search history.

(56) References Cited

U.S. PATENT DOCUMENTS

| 6,237,551 | B1 * | 5/2001 | Macor et al. ............... 123/90.15 |
| 6,276,334 | B1 * | 8/2001 | Flynn et al. .................... 123/435 |
| 7,080,613 | B2 * | 7/2006 | Kuo et al. ......................... 123/64 |
| 2003/0047159 | A1 | 3/2003 | Shimazaki | |

FOREIGN PATENT DOCUMENTS

| EP | 1 291 516 | 3/2003 |
| JP | 53-100313 | 9/1978 |
| JP | 59-141756 | 8/1984 |
| JP | 62-247108 | 10/1987 |
| JP | 11-264319 A | 9/1999 |
| JP | 2001-098963 A | 4/2001 |
| JP | 2003-083119 A | 3/2003 |
| JP | 2003-520314 A | 7/2003 |
| WO | 99/18335 A1 | 4/1999 |

OTHER PUBLICATIONS

International Search Report for U.S. Appl. No. PCT/2006/300498 dated Apr. 18, 2006.

* cited by examiner

*Primary Examiner* — Ching Chang
(74) *Attorney, Agent, or Firm* — McCormick, Paulding & Huber LLP

(57) ABSTRACT

An exhaust valve control method for a diesel engine 6 for switching between a normal combustion mode and a premixed combustion mode according to operating conditions; an exhaust valve 9 is opened only in the exhaust stroke in the normal combustion mode, and two-stage valve opening control is carried out to open the exhaust valve 9 not only in the exhaust stroke, but also between the latter part of the air inlet stroke and the initial stage of the compression stroke in the premixed combustion mode.

8 Claims, 9 Drawing Sheets

EXHAUST VALVE CONTROL METHOD AND EXHAUST VALVE CONTROL DEVICE FOR DIESEL ENGINE

CROSS REFERENCE TO RELATED APPLICATIONS

This application is entitled to the benefit of and incorporates by reference essential subject matter disclosed in International Patent Application No. PCT/JP2006/300498 filed on Jan. 17, 2006 and Japanese Patent Application No. 2005-028827 filed Feb. 4, 2005.

TECHNICAL FIELD

The present invention relates to an exhaust valve control method and an exhaust valve control device for a diesel engine for switching between a normal combustion mode and a premixed combustion mode according to the operating conditions of the engine, and particularly to an exhaust valve control method and an exhaust valve control device made to carry out internal EGR by carrying out two-stage valve opening control of the exhaust valve during premixed combustion mode.

BACKGROUND ART

A diesel engine for switching between a normal combustion mode and a premixed combustion mode according to the operating conditions of the internal combustion engine is described using FIG. 9 (refer to Japanese Laid-Open Publication No. JP 2003-83119A).

In normal combustion mode, fuel is injected from a fuel injection nozzle 2 into a cavity 3 at top of the piston surface at the timing when a piston 1 is near the compression top dead center as in an ordinary engine. In the sample drawing, injection of the fuel begins at any point between BTDC 10° and 0°. In this normal combustion mode, an aspect of diffusion combustion is adopted wherein the fuel injected in the initial stage of fuel injection ignites after an ignition delay time, and fuel is continuously injected into the flame formed thereby, and that fuel combusts. In that diffusion combustion, additional fuel is injected into the flame and combusted, so fuel must be supplied and combusted in a location where oxygen is originally scarce, and smoke is readily generated. The premixed combustion mode described below is therefore used at the same time according to the operating conditions of the engine.

The premixed combustion mode is for injecting fuel from the fuel injection nozzle 2 into the cavity 3 at an earlier timing than the normal combustion mode and at timing when ignition of the fuel occurs after the injection ends. In the sample drawing, the injection of fuel begins at any timing between BTDC 50° and 20°. In this premixed combustion mode, all of the injected fuel is mixed with air and combusts after the interior of the combustion chamber is substantially uniformly rarefied, so combustion occurs in a state with adequate oxygen present in the environs of the fuel, the generation of smoke can be curbed, and the generation of $NO_x$ can also be curbed because the combustion rate is relatively slow and the combustion temperature does not rise rapidly.

Patent Document 1: Japanese Patent Application Laid-open No. 2003-83119

DISCLOSURE OF THE INVENTION

Execution of the premixed combustion mode during high load operation of the engine is difficult. This is because a large volume of fuel is injected during high load operation, so when the fuel is injected from the fuel injection nozzle 2 earlier than normal combustion, combustion begins before the piston 1 reaches near the top dead center, knocking becomes intense, and the engine may be damaged. Therefore, the normal combustion mode is used during high load operation of an engine and a switch is made to the premixed combustion mode during low load operation.

As a result of repeated research on the occurrence of knocking during the premixed combustion mode, the inventor has come to understand the following facts. As the result of experiments and simulations conducted by the inventors of the present invention, it became clear that the temperature of a periphery of a squish clearance near compression top dead center of the piston 1, that is an outer periphery 4 of the cavity 3 of the top of the piston 1, rises about several tens of K higher than other portions. It is also understood that the knocking described above occurs with ignition as the trigger in the temperature elevation level of the piston outer periphery 4. Consequently, if the combustion reaction at the outer periphery 4 is curbed, it is possible to curb the problem of knocking in the premixed combustion mode, and the operation range of the premixed combustion mode can be expanded to high loads.

EGR (exhaust gas recirculation) is known as a technique for curbing combustion reactions. With ordinary EGR, the exhaust pipe and the air inlet pipe are connected to the EGR pipe and EGR is carried out through the EGR pipe. EGR gas (exhaust gas) is guided into the cylinder in a state mixed with the inlet air (air), and it is not possible to guide only EGR gas into the cylinder. Consequently, the knocking is suppressed with a mixture of EGR gas and air, and at least a certain volume of EGR gas (EGR rate) is required to prevent the knocking. The air inlet rate into the cylinder is therefore decreased to that extent, bringing about a decrease in output and generation of smoke, so broadening the use of the premixed combustion mode to high load operation range has been limited.

Another EGR method, internal EGR in which a portion of exhaust gas inside the exhaust port is guided into the cylinder by re-opening the exhaust valve not only in the exhaust stroke but also between the initial and the middle stages of the air inlet stroke, is also known. However, also with this internal EGR type, the exhaust valve is open from the initial to the middle stage of the air inlet stroke, so the EGR gas guided into the cylinder is strongly affected by the flow, particularly the tumble flow occurring inside the cylinder in the air inlet stroke, and becomes mixed with inlet air inside the cylinder, resulting in the knocking being suppressed by the mixture of the EGR gas and air. Consequently, the same problem as mentioned before occurs.

With the foregoing circumstances in view, it is an object of the present invention to provide an exhaust valve control method and exhaust valve control device for a diesel engine wherein EGR gas is arranged by layering at the upper portion inside the cylinder without being mixed with the inlet air and without being diffused inside the cylinder, such that knocking can be efficiently controlled with less EGR gas volume (EGR rate) than is required according to conventional methods.

In order to achieve the above-mentioned object, the first aspect of the present invention is an exhaust valve control method for a diesel engine for switching between a normal combustion mode and a premixed combustion mode depending on operating conditions, wherein an exhaust valve is opened only in an exhaust stroke during the normal combustion mode, and two-stage valve opening control for opening the above-mentioned exhaust valve is carried out not only in the exhaust stroke but also between the latter part of an air inlet stroke and the initial stage of a compression stroke during the premixed combustion mode.

The second aspect of the present invention is an exhaust valve control device for a diesel engine for switching between a normal combustion mode and a premixed combustion mode depending on operating conditions, having an exhaust valve drive device capable of changing an opening and closing timing and time of an exhaust valve and a control unit for controlling the exhaust valve drive device, wherein the control unit controls the above-mentioned exhaust valve drive device so as to open the above-mentioned exhaust valve only during an exhaust stroke during the above-mentioned normal combustion mode, and controls the above-mentioned exhaust valve drive device so as to carry out two-stage valve opening control to open the above-mentioned exhaust valve not only in the exhaust stroke, but also between the latter part of an air inlet stroke and the initial stage of a compression stroke during the above-mentioned premixed combustion mode.

According to the present invention, the exhaust valve is opened between the latter part of the air inlet stroke and the initial stage of the compression stroke during the premixed combustion mode, a portion of the exhaust gas inside the exhaust port is thereby gently taken into the cylinder and arranged in a layered state at the upper portion inside the cylinder almost without being mixed with the inlet air and without being diffused, so knocking can be efficiently prevented with a low EGR gas volume (EGR rate). Consequently, the inlet air volume into the cylinder can be increased over the conventional volume, and output decrease and smoke generation can be avoided, so the premixed combustion mode can be expanded to a wider high load operation range than is presently possible using conventional methods.

DETAILED DESCRIPTION OF THE PREFERRED EMBODIMENTS

Preferred embodiments of the present invention are described below based on the attached drawings.

Figure 2:
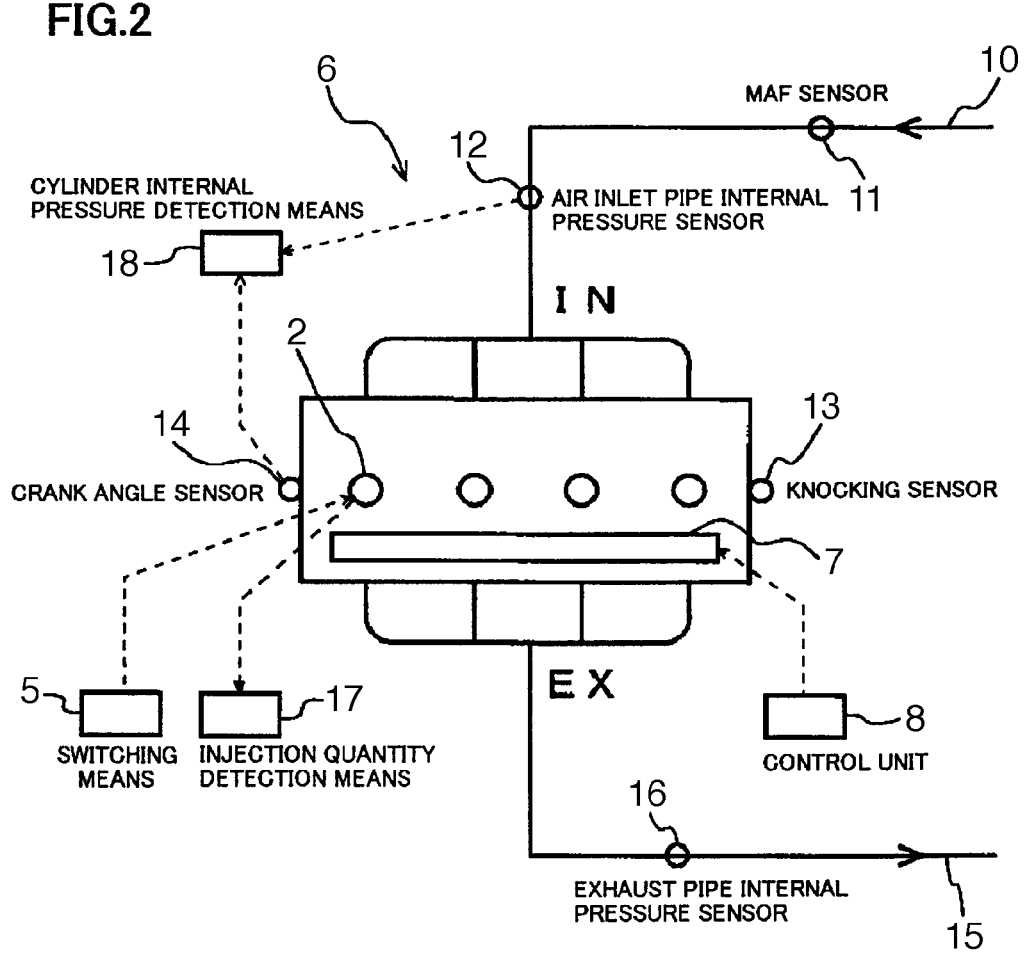
FIG. 2 is a system chart showing the entire exhaust valve control device for a diesel engine according to the preferred embodiment of the present invention.

To explain an outline of the exhaust valve control method and exhaust valve control device according to the present embodiment, as shown in FIG. 2, the present method and device are applied to a diesel engine 6 comprising a switching means 5 for setting the injection timing and time of fuel injected from the fuel injection nozzle 2 to the normal combustion mode during high load operation of the engine 6 and switching to the premixed combustion mode during low and medium load operation. The diesel engine 6 further comprises an exhaust valve drive device 7 capable of changing the opening and closing timing and time of the exhaust valve, and a control unit 8 for controlling the exhaust valve drive device 7.

Figure 1:
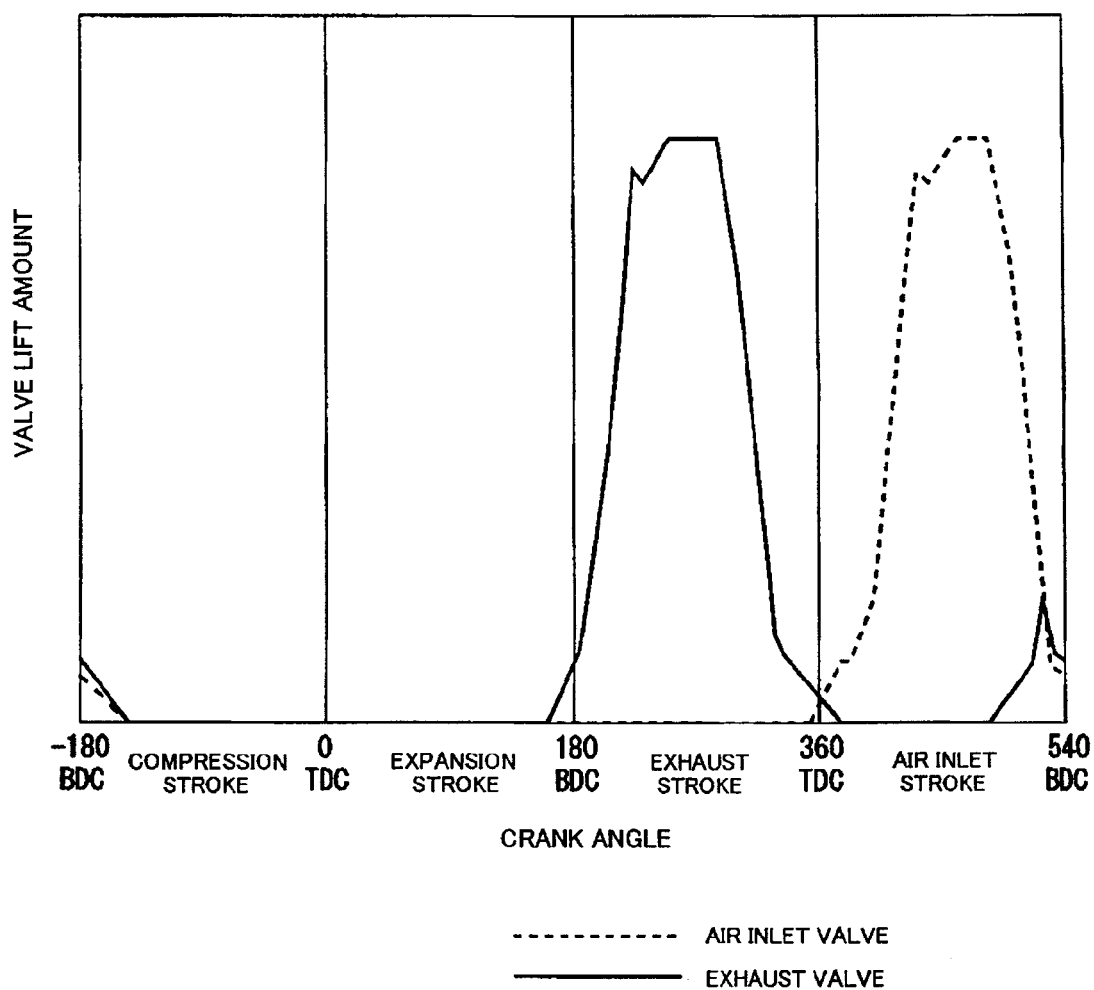
FIG. 1 is a valve lift curve diagram showing the exhaust valve control method for a diesel engine according to a preferred embodiment of the present invention.

When the switching means 5 has switched the injection timing and time of the fuel injected from the fuel injection nozzle 2 to the normal combustion mode during high load operation, the control unit 8 controls the exhaust valve drive device 7 such as to open the exhaust valve as normal in the exhaust stroke, but does not carry out internal EGR (already described). Also, when the switching means 5 has switched the injection timing and time of the fuel injected from the fuel injection nozzle 2 to the premixed combustion mode during low or medium load operation, the control unit 8 controls the exhaust valve drive device 7 such as to carry out two-stage valve opening control for opening the exhaust valve not only in the exhaust stroke but between the latter part of the air inlet stroke and the initial stage of the compression stroke as shown in FIG. 1, and carries out internal EGR.

Figure 4:
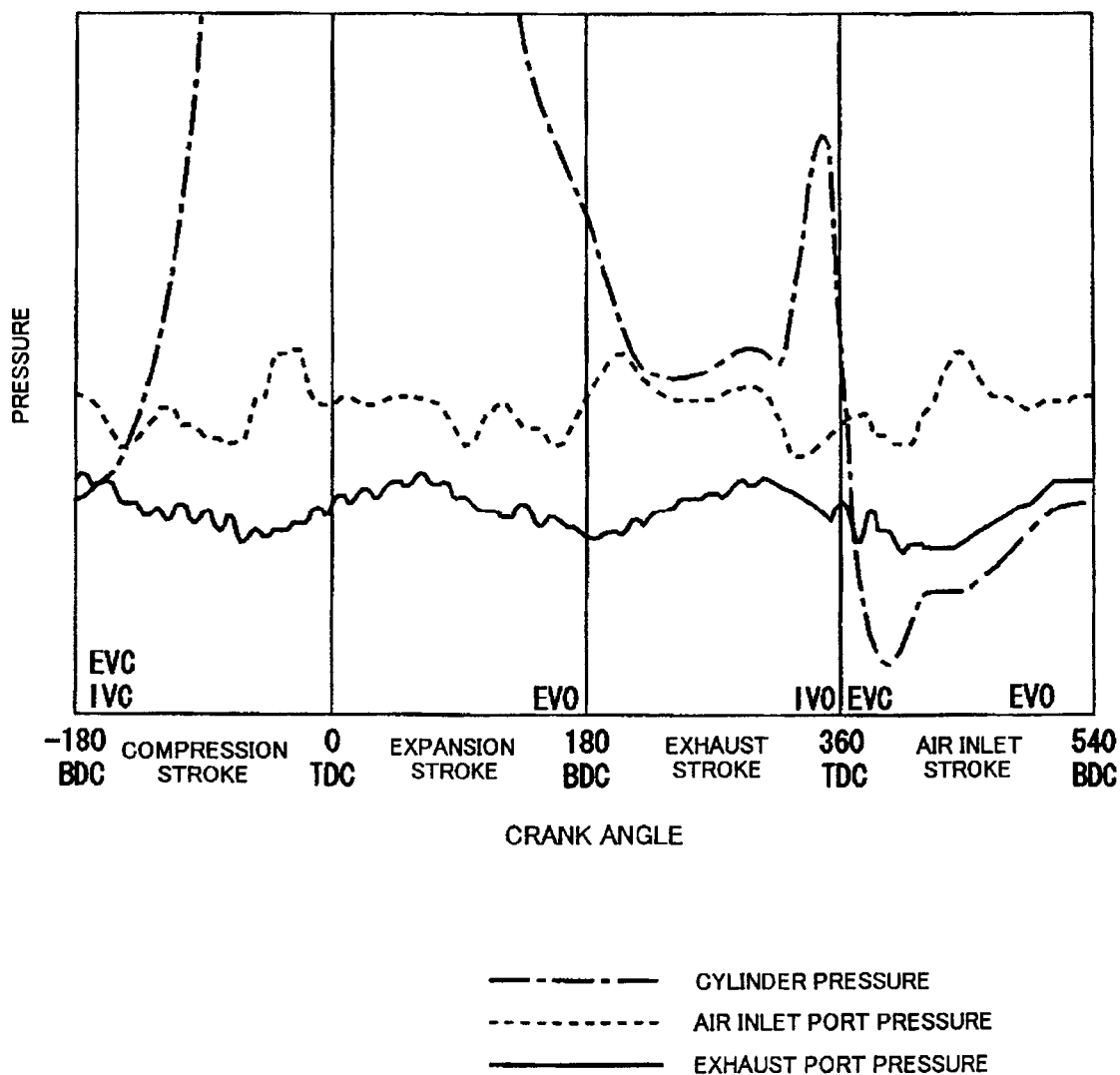
FIG. 4 is an explanatory diagram showing the relationship among cylinder pressure, air inlet port pressure, and exhaust port pressure.
Figure 5:
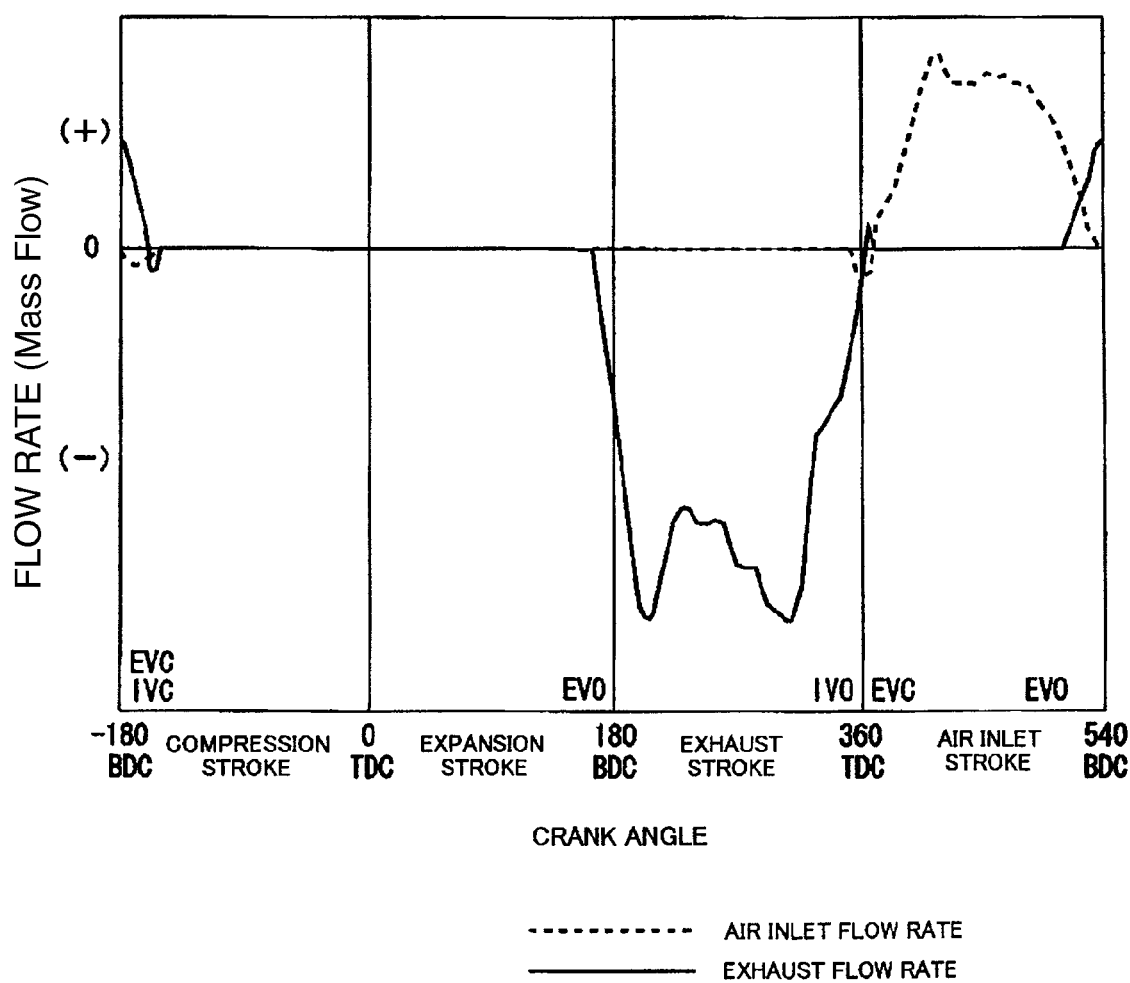
FIG. 5 is an explanatory diagram showing the relationship between exhaust flow rate and air inlet flow rate.

When the exhaust valve is opened between the latter part of the air inlet stroke and the initial stage of the compression stroke, as shown in FIG. 4, the valve opens at a time when the pressure inside the exhaust port is slightly higher than the pressure inside the cylinder, so a portion of the exhaust gas inside the exhaust port is gently taken into the cylinder, and inhalation of air from the air inlet port into the cylinder is substantially completed at this time as shown in FIG. 5, so the EGR gas taken into the cylinder is arranged in a layered state at the upper portion inside the cylinder without being turbidly mixed with the inlet air (air) and without being diffused inside the cylinder.

When EGR gas with hardly any air mixed in is arranged in a layered state in the upper portion inside the cylinder, an elevation in temperature occurs near the compression top dead center of the piston 1, so the combustion reaction in the outer periphery 4 of the cavity 3 of the top portion of piston 1, the knocking trigger, is efficiently curbed with a lower EGR gas volume (EGR rate) than in conventional examples. Consequently, a smaller EGR gas volume (EGR rate) is required to prevent knocking than in conventional examples, the air inlet rate into the cylinder is increased over conventional examples to that extent, and lowered output and smoke generation during EGR is curbed, thereby enabling the extension of the operation range of the premixed combustion mode to high loads.

The exhaust valve control method and exhaust valve control device according to the present embodiment are described below in detail.

Figure 6:
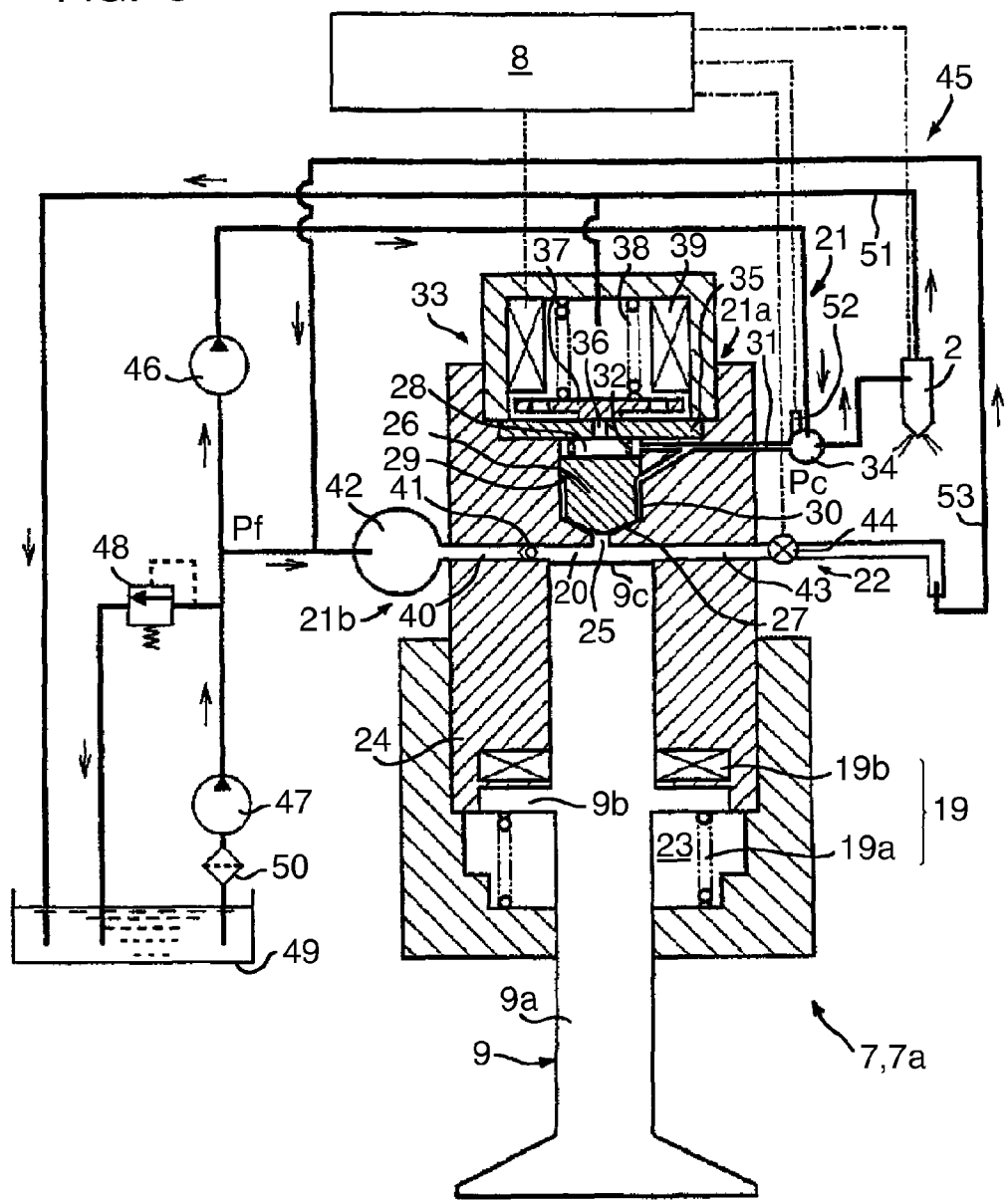
FIG. 6 is a side cross-section view showing a camless valve mechanism as an exhaust valve drive device.

In the present embodiment, a camless valve drive device 7a shown in FIG. 6 is used lacking the mechanical cam of the exhaust valve drive device 7 shown in FIG. 2. This device 7a is described below in detail, and it is made such as to be able to arbitrarily change the timing and time of the opening and closing of the exhaust valve 9 based on a command from the control unit 8.

As shown in FIG. 2, an MAF (mass air flow) sensor 11 for measuring the air inlet rate and an air inlet pipe internal pressure sensor 12 for measuring the internal pressure of an inlet pipe 10 of the engine 6 are provided in the air inlet pipe 10, a knocking sensor (such as an acceleration rate sensor) 13 for measuring the intensity of knocking based on the magnitude of swing or the like is provided at the cylinder body or the like of the engine 6, a crank angle sensor 14 for detecting the angle of the crankshaft is provided inside the engine 6, and an exhaust pipe internal pressure sensor 16 for measuring the internal pressure of the exhaust pipe 15 is provided in the exhaust pipe 15 of the engine 6.

Furthermore, fuel injection quantity detection means 17 for detecting the volume of fuel injected from the fuel injection nozzle 2 based on a target injection rate or the like is provided, and cylinder internal pressure detection means 18 for detecting the cylinder internal pressure of the engine 6 is provided. The cylinder internal detection means 18 has the above-mentioned crank angle sensor 14 and the above-mentioned air inlet pipe internal pressure sensor 12, and calculates the cylinder internal pressure at each crank angle based on the internal pressure of the air inlet pipe 10 measured at least with the air inlet pipe internal pressure sensor 12. The calculation is based on a map obtained experimentally or in simulations, an approximation formula, or the like. The cylinder internal pressure detection means 18 may use the load (acceleration rate), engine revolution speed, or the like in addition to the above-mentioned internal pressure of the air inlet pipe 10 as a parameter for calculating the cylinder internal pressure.

The switching means 5 sets the injection timing and time of the fuel injected from the fuel injection nozzle 2 to the normal combustion mode during high load operation and switches to the premixed combustion mode during low and medium load operation, but the determination of whether there is a high load or a low or medium load is made by determining a low or medium load when the air surplus ratio (air surplus ratio $\lambda$=(supply A/F value)/(logical A/F value)) calculated from the air inlet rate measured by the MAF sensor 11 and the fuel injection quantity detected by the fuel injection quantity detection means 17 is more than a predetermined value (such as 2.5) and determining a high load when the above described air surplus ratio is less than the above predetermined value. In other words, if the air surplus ratio is more than the above-mentioned predetermined value, there is a low or medium load so the premixed combustion mode is set, and if the air surplus ratio is less than the above-mentioned predetermined value, there is a high load, so the normal operation mode is set.

Figure 3:
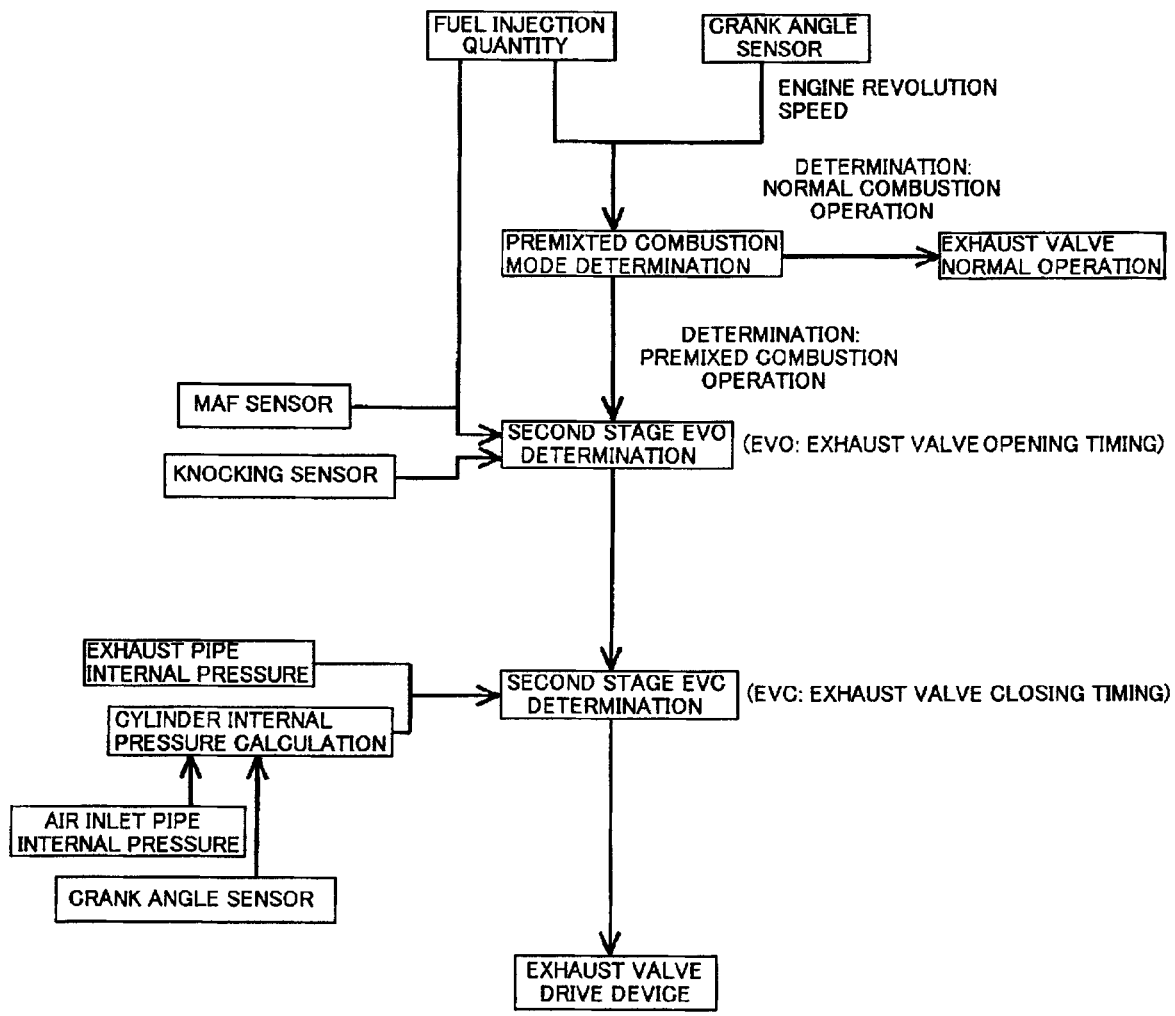
FIG. 3 is an explanatory diagram showing the flow for determining the second stage valve opening timing and valve closing timing of the exhaust valve in the above-mentioned method and device.

The control unit 8 controls the exhaust valve drive device 7 such as to open the exhaust valve 9 as normal in the exhaust stroke during the normal combustion mode, and to control the exhaust valve drive device 7 such as to carry out two-stage valve opening control of the exhaust valve 9 not only in the exhaust stroke, but also, as shown in FIG. 1, between the latter part of the air inlet stroke and the initial stage of the compression stroke. The opening and closing timing and time of the exhaust valve 9 during the normal combustion mode is the same as with ordinary engines, so an explanation thereof is omitted, but the above-mentioned two-stage valve opening control of the exhaust valve 9 during the premixed combustion mode is described below using FIG. 3.

First, the crank angle sensor 14 detects the crank angle during fuel injection, and the injection quantity detection means 17 detects the fuel injection quantity, then a determination is made whether or not the current timing and volume of the fuel injection are in the premixed combustion mode based on the detected values. Additionally, the determination of whether or not the premixed combustion mode is set can also be made according to whether or not the air surplus ratio detected by the MAF sensor 11 and the injection quantity detection means 17 is more than the above-mentioned predetermined value.

Also, the degree of rotation of the crankshaft per unit time, that is the engine revolution speed, may be detected by the crank angle sensor 14, the fuel injection quantity may be detected by the injection quantity detection means 17, and a determination may be made as to whether or not the premixed combustion mode is set based on those values. For example, if the engine revolution speed is less than a predetermined speed and the fuel injection rate is less than a predetermined quantity, it is determined that the premixed combustion mode is set, and if not, it is determined that the normal combustion mode is set.

If it is determined that premixed combustion mode is set, the exhaust valve 9 undergoes two-stage valve opening control as shown in FIG. 1, but the timing and the time of the first stage opening and closing of the exhaust valve 9 are similar to those of during the normal combustion mode (similar to an ordinary engine), controlled according to predetermined opening and closing timing and time of such that the exhaust is optimal in the exhaust stroke. The opening and closing timing and time of the second stage of the exhaust valve 9 are characteristics of the present embodiment and are determined as follows.

Because the valve re-opening timing (EVO) of the exhaust valve 9 affects the new air inlet rate, it is determined based on the A/F (air-fuel ratio) value calculated from the air inlet rate measured by the MAF sensor 11, the fuel injection quantity detected by the fuel injection quantity detection means 17 and on the knocking intensity measured by the knocking sensor 13. Specifically, it is determined based on the conditions that the A/F value is greater than or equal to a predetermined value and that the knocking intensity is no greater than a different predetermined value.

For example, if the valve opening timing of the exhaust valve 9 is earlier than suitable, the EGR gas volume (EGR ratio) guided into the cylinder from the exhaust port increases and the air inlet rate decreases to that extent, so the A/F value decreases. In that case, the valve opening timing is delayed to decrease the EGR gas volume, thereby maintaining the A/F value to greater than or equal to a predetermined value in the premixed combustion mode, and ensuring a predetermined new air inlet rate, so a decrease in output and the generation of smoke are avoided.

Conversely, if the valve opening timing of the exhaust valve 9 is delayed excessively, the EGR gas volume decreases, so it is not possible to adequately curb the combustion reaction which is the trigger for knocking in the outer periphery 4 of the cavity 3 of the top part of piston 1 and the knocking intensifies, so the valve opening timing may be advanced in order to increase the EGR gas volume. It is thereby possible to ensure an EGR gas volume at a quantity at which knocking can be prevented in the premixed combustion mode, and to prevent knocking.

In order to prevent the gas inside the cylinder from flowing out to the exhaust port, appropriate the valve closing timing (EVC) of the exhaust valve 9 is decided after comparing the internal pressure of the exhaust pipe 15 measured by the exhaust pipe internal pressure sensor 16 and the cylinder internal pressure detected by the cylinder internal pressure detection means 18. That is, the determination is made based on the condition that the internal pressure of the exhaust pipe 15 measured by the exhaust pipe internal pressure sensor 16 is greater than or equal to the cylinder internal pressure detected by the cylinder internal pressure detection means 18.

In this regard, as shown in FIG. 4, the exhaust port internal pressure of the initial stage of the compression stroke increases more than the cylinder internal pressure until basically a predetermined crank angle at which a slight difference occurs according to the operation conditions. Consequently, when the exhaust port internal pressure is greater than the cylinder internal pressure, the exhaust valve 9 is opened, and when the pressure relationship is inverted, the exhaust valve 9 is closed, thereby preventing the EGR gas guided into the cylinder from flowing to the exhaust port.

The control unit 8 controls the exhaust valve drive device 7 (camless valve drive device 7*a*) based on the thereby determined valve opening timing (EVO) and valve closing timing (EVC) of the exhaust valve. The determination of the valve opening timing (EVO) and the valve closing timing (EVC) of the exhaust valve 9 may be carried out each time the exhaust valve 9 is opened or closed, or it may be carried out at predetermined times of openings/closings to simplify control.

As described above, a decrease in output can be avoided with an EGR gas volume (EGR rate) lower than in conventional examples in the premixed combustion mode while effectively preventing knocking by controlling the valve opening timing (EVO) and valve closing timing (EVC) of the exhaust valve 9. Accordingly, the premixed combustion mode can be expanded to a wider range of high load operations than has been conventionally possible.

The camless valve drive device 71*a* is described using FIG. 6.

The camless valve drive device 7*a* comprises biasing means 19 for biasing the exhaust valve 9 in the valve closing direction, a pressure chamber 20 to which a working fluid pressurized to open the exhaust valve 9 against the biasing force of the biasing means 19 is supplied, supply means 21 for supplying the above-mentioned working fluid into the pressure chamber 20, and discharge means 22 for discharging the above-mentioned working fluid from the pressure chamber 20. The control unit 8 controls the valve opening timing (EVO) of the exhaust valve 9 by means of the supply means 21 controlling the supply timing of the above-mentioned working fluid into the pressure chamber 20, and the control unit 8 controls the valve closing timing (EVC) of the exhaust valve 9 by means of the discharge means 22 controlling the discharge timing of the above-mentioned working fluid from the pressure chamber 20.

The above-mentioned biasing means 19 has a valve spring 19*a* housed inside a valve spring chamber 23 in a compressed state for biasing the exhaust valve 9 in the valve closing direction by biasing a flange 9*b* provided at a stem part 9*a* of the exhaust valve 9 upward, and a magnet 19*b* (a permanent magnet, an electromagnet, or the like) housed in an actuator body 24 above the valve spring chamber 23 for biasing the exhaust valve 9 in the closing direction by magnetically attracting the above-mentioned flange 9*b*.

The above-mentioned pressure chamber 20 is formed at the upper portion of a round hole formed such that the stem part 9*a* of the exhaust valve 9 is slidably housed inside the actuator body 24, and the bottom surface portion is divided by a top surface 9*c* of the above-mentioned stem part 9*a*. Consequently, the above-mentioned working fluid is supplied into the pressure chamber 20 by the supply means 21, and when the force for opening the exhaust valve 9 due to the pressure inside the pressure chamber 20 acting on the top surface 9*c* exceeds the biasing force in the closing direction due to the valve spring 19*a* and the magnet 19*b*, the exhaust valve 9 opens.

The above-mentioned supply means 21 has high-pressure working fluid supply means 21*a* for supplying high-pressure working fluid into the pressure chamber 20 in a predetermined interval of the initial valve opening stage of the exhaust valve 9 and low-pressure working fluid supply means 21*b* for supplying a low-pressure working fluid to the pressure chamber 20 after the above-mentioned predetermined interval of the initial valve opening stage elapses. The high-pressure working fluid supply means 21*a* injects high-pressure working fluid toward the top surface 9*c* of the above-mentioned stem part 9*a* from above the pressure chamber 20. The injected high-pressure working fluid thereby flows to the top surface 9*c* of the above-mentioned stem part 9*a*, pressing the top surface 9*c* downward and suddenly increasing the pressure inside the pressure chamber 20, so the initial energy required for the valve opening of the exhaust valve 9 is provided to open the exhaust valve 9 with great force.

The exhaust valve 9 then lifts due to inertial movement, and due to the inertial movement of the exhaust valve 9 caused by injection of the high-pressure working fluid, the actual capacity increase volume of the pressure chamber 20 at that time becomes larger than the theoretical capacity increase volume of the pressure chamber 20 in response to the supply volume of the high-pressure working fluid and the interior of the pressure chamber 20 may therefore become negatively pressurized. However, the low-pressure working fluid is guided into the pressure chamber 20 by the low-pressure working fluid supply means 21*b* during lifting, so negative pressurization of the pressure chamber 20 is avoided. Consequently, the lift movement of the exhaust valve 9 stabilizes, and an amount of lifting is ensured corresponding to the initial energy provided by the supply of the high-pressure working fluid.

The high-pressure working fluid supply means 21*a* has a balance valve 26 housed so as to be capable of rising and lowering inside a balance valve housing chamber formed in communication with the upper part of the pressure chamber 20 through an outlet hole 25, a valve closing chamber 28 formed above the balance valve 26 for pressing the balance valve 26 against the valve seat 27 formed in a mortar shape at the circumference of the outlet hole 25 when the high-pressure working fluid is supplied and acts on the top surface of the balance valve 26, a valve opening chamber 30 formed at the side of the balance valve 26 for lifting the balance valve 26 from the valve seat 27 when the high-pressure working fluid is supplied and acts on a step portion 29 formed in a cone shape at the side of the balance valve 26 and the bottom surface of that cone shape, a high-pressure supply passage 31 for supplying the high-pressure working fluid to the valve opening chamber 30 and the valve closing chamber 28, a spring 32 housed in the valve closing chamber 28 for gently pressing the balance valve 26 against the valve seat 27, and relief means 33 for letting pressure inside the valve closing chamber 28 escape. Fuel accumulated in a high-pressure state (several tens to hundreds of MPa) in a common rail 34 as described below is supplied as the high-pressure working fluid to the high-pressure supply passage 31.

If the pressure inside the valve closing chamber 28 is sealed without being released by the relief means 33, the valve closing force acting on the top surface of the balance valve 26 and the valve opening force acting on the step portion 29 and the bottom surface portion of the balance valve 26 become equivalent, so the balance valve 26 is seated in the valve seat 27 and closes due to the force of the spring 32. Once the valve closes, the bottom surface portion of the balance valve 26 is seated in the valve seat 27 and covered, so the pressure of the working fluid no longer acts on the bottom surface portion, and the above-mentioned valve opening force decreases, increasing the above-mentioned valve closing force, so the balance valve 26 is securely seated in the valve seat 27 and closed. When the pressure inside the valve closing chamber 28 is released by the relief means 33, the above-mentioned valve closing force becomes markedly small and the above-mentioned valve opening force increases, so even taking into account the force of the spring 32, the balance valve 26 separates from the valve seat 27 and lifts quickly to open. The high-pressure working fluid then passes through the outlet hole 25 and is injected into the pressure chamber 20 with great force.

The above-mentioned relief means 33 comprises a relief hole 36 formed at a lid plate 35 for dividing the top portion of the valve closing chamber 28, a valve body 37 disposed on the top surface of the lid plate 35 for opening and closing the relief hole 36, a spring 38 for pressing the valve body 37 against the lid plate 35 to cover and close the relief hole 36, and an electromagnetic solenoid 39 for magnetically attracting the valve body 37 to open the relief hole 36 to open the valve. When the electromagnetic solenoid 39 is in an unpowered state, the valve body 37 is seated on the lid plate 35 due to the force of the spring 38, and blocks the relief hole 36 to close the valve, and when the electromagnetic solenoid 39 is powered, the valve body 37 is attracted and moves upward, separating from the lid plate 35, and releases the relief hole 36 to open the valve.

The current to the electromagnetic solenoid 39 is appropriately turned on and off in response to a command from the control unit 8 (an electronic control unit). When the current to the electromagnetic solenoid 39 is turned on, the valve body 37 is attracted and moves to open, the balance valve 26 opens, the high-pressure working fluid is injected into the pressure chamber 20, and the exhaust valve 9 is lowered and opens (lifts). The valve opening timing (EVO) of the exhaust valve 9 can thereby be controlled. When the current to the electromagnetic solenoid 39 is turned off, the valve body 37 is closed by the force of the spring 38, the balance valve 26 closes, and the high-pressure working fluid is no longer injected into the pressure chamber 20, so the force for opening (lifting) the exhaust valve 9 ceases. The amount of lift of the exhaust valve 9 can thereby be controlled.

The low-pressure working fluid supply means 21b comprises a low-pressure supply passage 40 in communication with the upper side portion of the pressure chamber 20 in order to supply the low-pressure working fluid into the pressure chamber 20 and a check valve 41 provided in the low-pressure supply passage 40. Fuel accumulated in a low-pressure state (0.5 MPa, for example) in a low-pressure chamber 42 as described below is supplied as the low-pressure working fluid to the low-pressure supply passage 40. According to this constitution, the working fluid flows from the low-pressure chamber 42 to the pressure chamber 20, but does not flow in the reverse direction, so the low-pressure working fluid inside the low-pressure chamber 42 is supplied to the pressure chamber 20 through the check valve 41 only when the pressure inside the pressure chamber 20 is lower than the upstream side of the check valve 41, and the check valve 41 blocks the pressure chamber 20 when the pressure inside the pressure chamber 20 is higher than the upstream side of the check valve 41.

According to the supply means 21 described above, when the balance valve 26 of the high-pressure working fluid supply means 21a is open and the high-pressure working fluid is injected from the outlet hole 25 into the pressure chamber 20, the exhaust valve 9 begins to open with great force as described above and is lifted by the inertial movement, so the capacity increase volume of the pressure chamber 20 becomes larger than the theoretical capacity increase volume of the pressure chamber 20 in response to the supply volume of the high-pressure working fluid and the interior of the pressure chamber 20 may therefore become negatively pressurized. However, if the pressure inside the pressure chamber 20 becomes lower than the pressure inside the low-pressure chamber 42 during lifting, the low-pressure working fluid is guided into the pressure chamber 20 by the low-pressure working fluid supply means 21b, so negative pressurization of the pressure chamber 20 is avoided. Consequently, the lift movement of the exhaust valve 9 stabilizes, and amount of lifting is ensured corresponding to the initial energy provided by the supply of the high-pressure working.

The exhaust valve 9 whose valve opening timing (EVO) is thus controlled by the high-pressure working fluid supply means 21a and whose stabilized lift movement is ensured by the low-pressure working fluid supply means 21b is closed (raised) due to the pressure inside the pressure chamber 20 being released by the discharge means 22, so the valve closing timing (EVC) can be controlled by controlling the timing of the release.

The discharge means 22 comprises a discharge passage 43 for communicating with the upper side portion of the pressure chamber 20 for discharging the working fluid inside the pressure chamber 20, and an opening-and-closing valve 44 provided in the discharge passage 43. The opening-and-closing valve 44 is opened and closed appropriately in response to a command from the control unit 8. The opening-and-closing valve 44 is made such that when closed, the pressure inside the pressure chamber 20 is maintained and the force for lifting the exhaust valve 9 is not released, and when open, the pressure inside the pressure chamber 20 is released, allowing the force for lifting the exhaust valve 9 to escape, closing the exhaust valve 9. Consequently, the control unit 8 controls the valve opening timing of the opening-and-closing valve 44 as described using FIGS. 1 and 2, making it possible to control the valve closing timing (EVC) of the exhaust valve 9.

The above-mentioned camless valve drive device 7a is incorporated in a fuel circuit (flow path) of a common rail fuel injection system 45 of the diesel engine as shown in FIG. 6 in the present embodiment, fuel whose pressure is increased by a high-pressure pump 46 and accumulated in a high-pressure state (from several tens to hundreds of MPa) inside the common rail 34 is used as the high-pressure working fluid of the high-pressure working fluid supply means 21a, and fuel accumulated in a low-pressure state (0.5 MPa, for example) inside the low-pressure chamber 42 by a feed pump 47 and a relief valve 48 is used as the low-pressure working fluid of the low-pressure working fluid supply means 21b.

Explaining the common rail fuel injection system 45, a fuel injection nozzle 2 for executing fuel injection is provided at each cylinder of the engine 6, and fuel accumulated in a high-pressure state in the common rail 34 is constantly supplied to the fuel injection nozzles 2. Fuel made into a high-pressure state (from several tens to hundreds of MPa) by the high-pressure pump 46 as above is force fed to the common rail 34, and fuel of a fuel tank 49 is force fed by a feed pump 47 through a fuel filter 50 to the high-pressure pump 46. A feed pressure Pf of the feed pump 47 is regulated by the relief valve 48 and maintained at constant pressure (0.5 MPa, for example).

The control unit 8 (an electronic control unit) is provided as a device for generally controlling the overall illustrated device, and sensors (refer to FIG. 2) for detecting operating states (the crank angle, revolution speed, engine load, and the like of the engine 6) of the engine 6 are connected to the control unit 8. The control unit 8 ascertains the operating states of the engine 6 based on signals from the sensors, transmits a drive signal based thereon to the electromagnetic solenoid of the fuel injection nozzles 2, controls the current to the electromagnetic solenoid to control opening and closing of the fuel injection nozzles 2, and controls execution and suspension of the fuel injection. When the fuel injection is suspended, fuel at about normal pressure (atmospheric pressure) returns from the fuel injection nozzle 2 to the fuel tank 49 through the return circuit 51. The control unit 8 feedback controls the pressure inside the common rail 34 toward a target pressure in response to the operating state of the engine 6. A sensor 52 for detecting the internal pressure is therefore provided at the common rail 34.

Explaining the insertion position of the camless valve drive device 7a in the common rail fuel injection system 45, the low-pressure chamber 42 of the camless valve drive device 7a communicates with a circuit between the feed pump 47 and the high-pressure pump 46 through a passage. Consequently, low-pressure fuel corresponding to the feed pressure Pf (0.5 MPa, for example) accumulates in the low-pressure chamber 42 and is used as the low-pressure working fluid. Also, the high-pressure supply passage 31 of the camless valve drive device 7a communicates with the common rail 34, and the high-pressure (from several tens to hundreds of MPa) fuel inside the common rail 34 is used as the high-pressure working fluid. The downstream side of the discharge passage 43 of the camless valve drive device 7a communicates with the fuel tank 49 through the return circuit 53, and the fuel discharged from the discharge passage 43 is returned to the fuel tank 49 through the return circuit 53.

The common rail fuel injection system 45 is not essential to the present embodiment. More specifically, another fluid that is not the high-pressure fuel in the common rail 34 may be used as the high-pressure working fluid of the camless valve drive device 7a, and another fluid that is not the low-pressure fuel inside the low-pressure chamber 42 may be used for the low-pressure working fluid.

Figure 7:
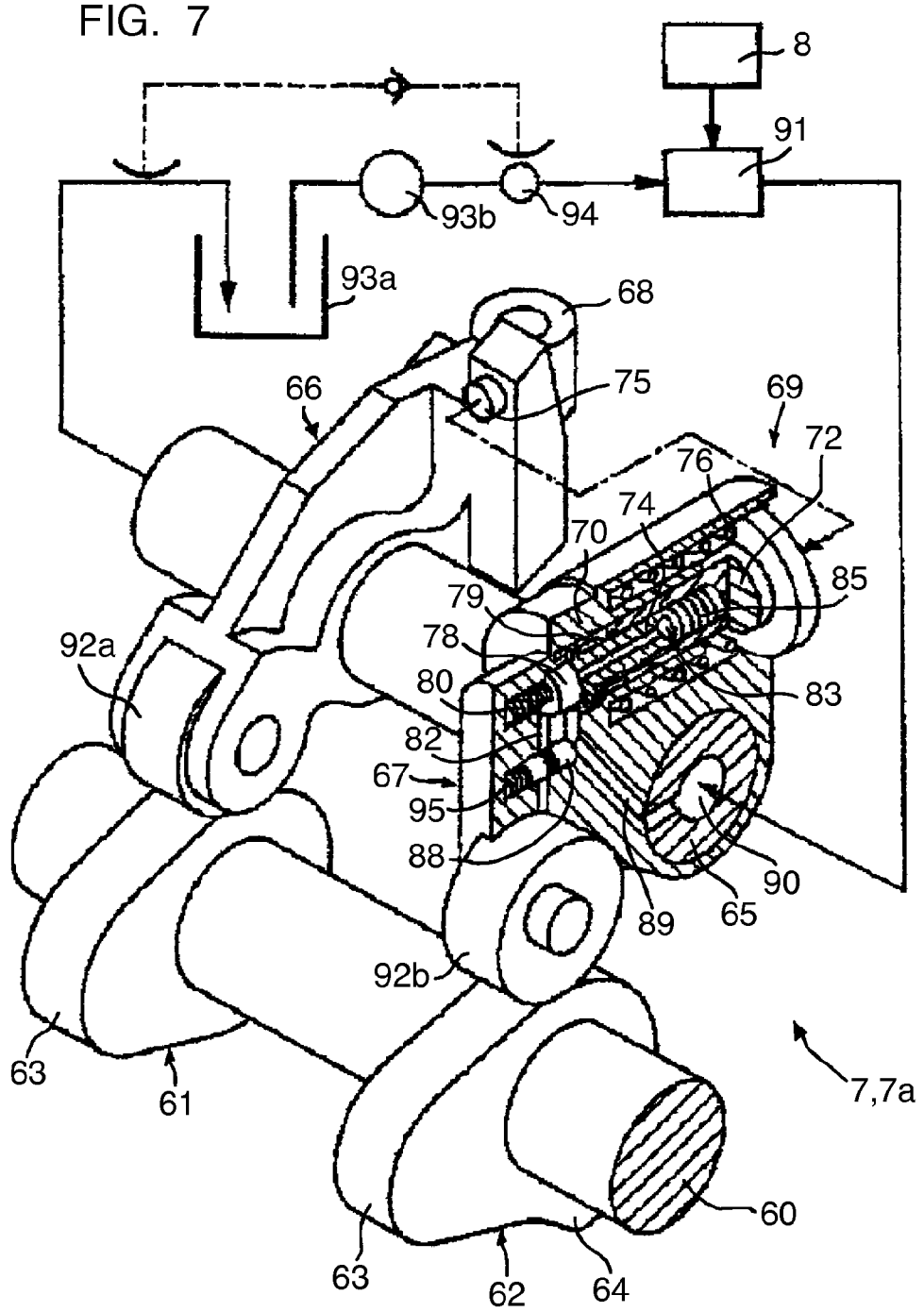
FIG. 7 is a perspective view showing an exhaust two-stage cam switching device as an exhaust valve drive device.
Figure 8:
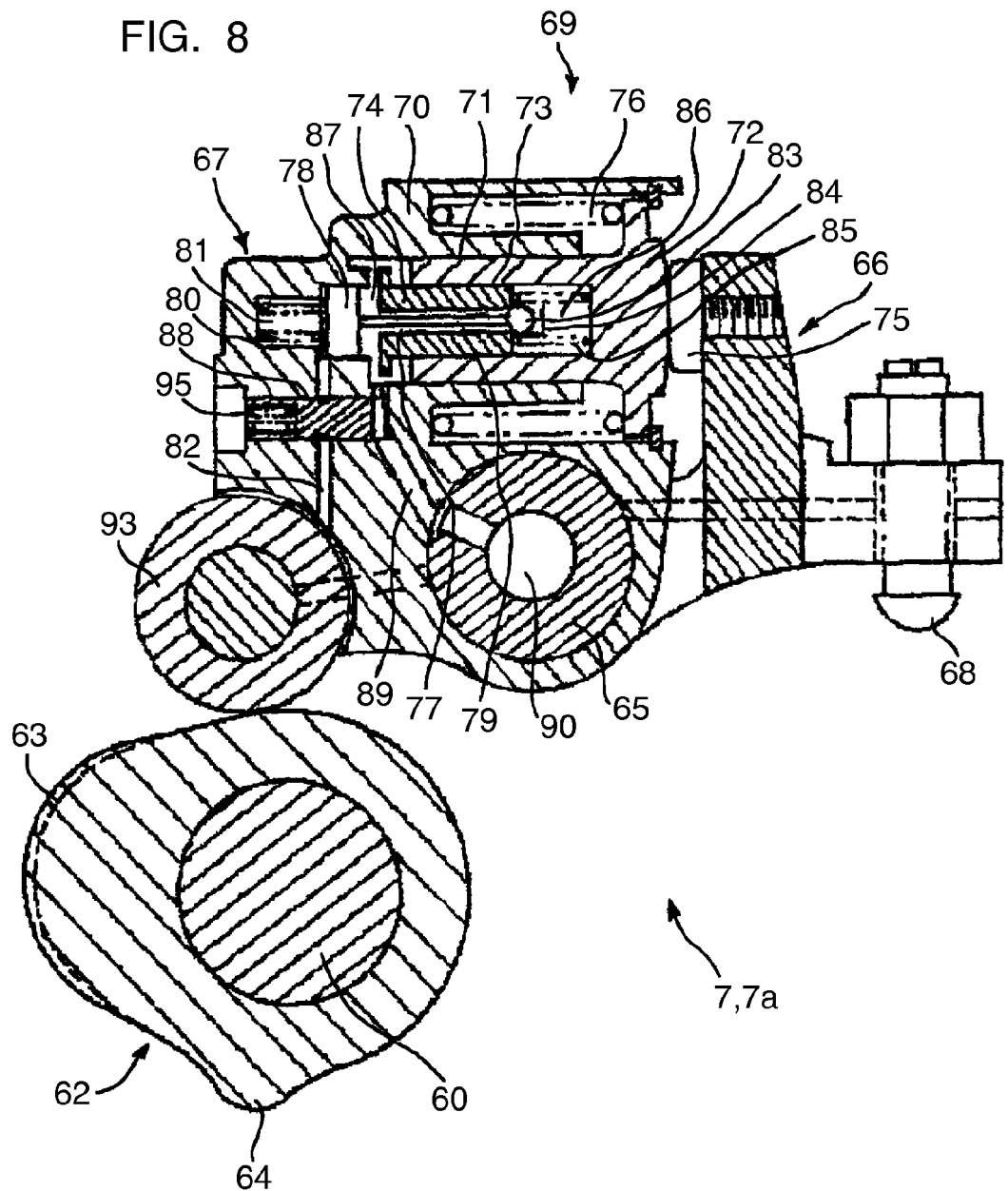
FIG. 8 is a side cross-section view of the above-mentioned exhaust two-stage cam switching device.
Figure 9:
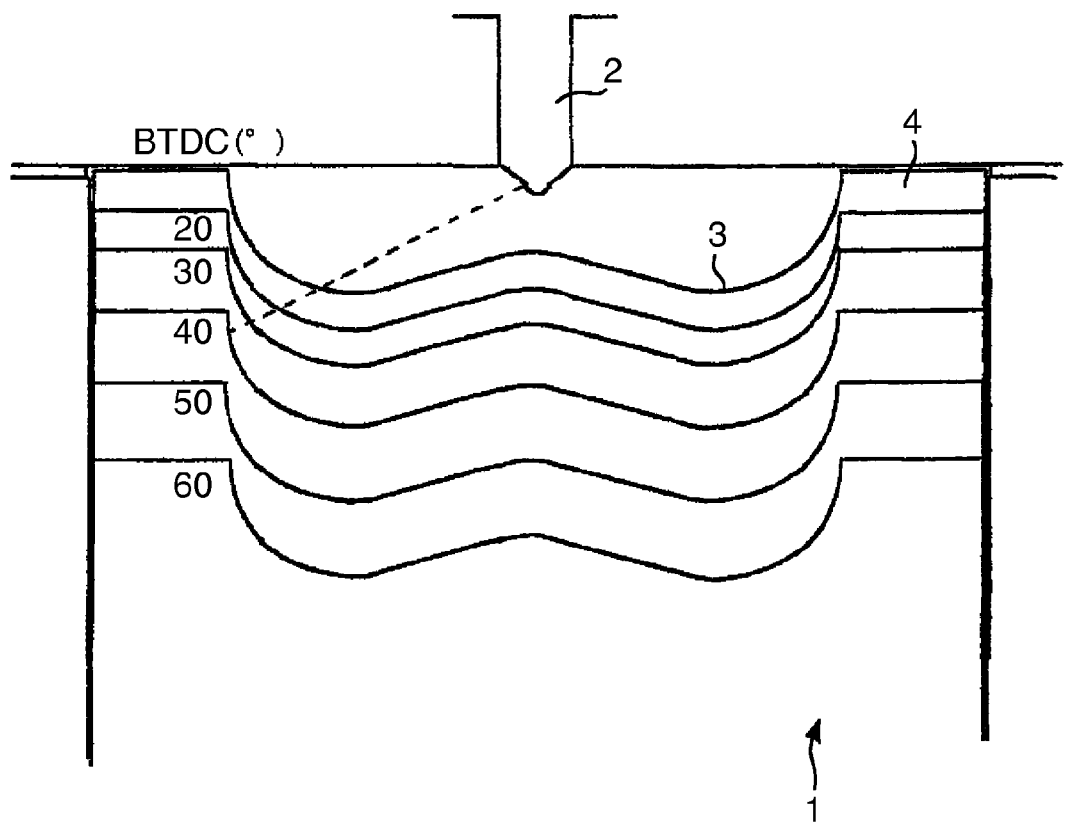
FIG. 9 is a side cross-section view of an engine showing fuel injection in the premixed combustion mode.

Next, an embodiment is described using FIGS. 7 and 8 wherein an exhaust two-stage cam switching device 7b is used for the exhaust valve drive device 7 shown in FIG. 2.

As illustrated, the exhaust two-stage cam switching device 7b comprises an exhaust camshaft 60 rotated by the crankshaft of the engine 6, first and second exhaust cams 61 and 62 provided at the camshaft 60, first cam peaks 63 respectively formed at the first and second exhaust cams 61 and 62 in an identical shape such as to open the exhaust valve (not illustrated) in the exhaust stroke, a second cam peak 64 formed at the second exhaust cam 62 such as to open the exhaust valve as shown in FIG. 1 between the latter part of the air inlet stroke and the initial stage of the compression stroke, first and second rocker arms 66 and 67 which are pivotally and separately inserted to a rocker shaft 65, corresponding to the first and second cams 61 and 62, a roller 92a provided at the first rocker arm 66 for contacting the first exhaust cam 61, and a roller 92b provided at the second rocker arm 67 for contacting the second exhaust cam 62.

The exhaust two-stage cam switching device 7b further comprises a pressing part 68 for pressing downward against the force of the valve spring to lift (open) the top portion of the stem portion of the exhaust valve provided at the end of the first rocker arm 66, and a cancelling mechanism 69 for switching between a two-stage valve opening mode for executing opening of the exhaust valve by means of the second cam peak 64 by conveying the swing of the second rocker arm 67 to the first rocker arm 66 and a disengaged mode for not conveying the swing of the second rocker arm 67 to the first rocker arm 66 to cancel opening of the exhaust valve by means of the second cam peak 64.

The control unit 8 sets the cancelling mechanism 69 to disengaged mode to stop the opening of the exhaust valve by means of the second cam peak 64 during operation in the normal combustion mode, and sets the cancelling mechanism 69 to the two-stage valve opening mode to execute the opening of the exhaust valve by means of the second cam peak 64 during operation in the premixed combustion mode (refer to FIG. 1). That is, during operation in the normal combustion mode, the cancelling mechanism 69 is set to disengaged mode, and the swing of the second rocker arm 67 is in a disengaged state and not conveyed to the first rocker arm 66, so the opening and closing of the exhaust valve are controlled by the first rocker arm 66 and are carried out as normal in the exhaust stroke. During operation in the premixed combustion mode, the cancelling mechanism 69 is set to the two-stage valve opening mode, and the swing of the second rocker arm 67 is conveyed to the first rocker arm 66, so the opening and closing of the exhaust valve are controlled by the first and second rocker arms 66 and 67, and in addition to the valve opening in the exhaust stroke as normal, the valve is opened between the latter part of the air inlet stroke and the initial stage of the compression stroke as well.

When the exhaust valve is opened during the premixed combustion mode between the latter part of the air inlet stroke and the initial stage of the compression stroke, the exhaust gas (EGR gas) inside the exhaust port is gently taken into the cylinder as described in detail for the previous embodiment and arranged in a layered state in the upper portion inside the cylinder almost without being mixed with the inlet (new) air inside the cylinder and without being diffused inside the cylinder. Consequently, the knocking can be efficiently prevented with a smaller EGR gas volume (EGR rate) than in conventional examples, the EGR gas volume (EGR rate) required to prevent the knocking is less than in conventional examples, the air inlet rate into the cylinder is increased over conventional examples to that extent, and output decrease and smoke generation during EGR are curbed, so the operation range of the premixed combustion mode can be expanded to high loads.

As shown in FIGS. 7 and 8, the cancelling mechanism 69 for switching whether the swing of the second rocker arm 67 is conveyed or not to the first rocker arm 66, that is, whether the exhaust valve is opened or not by means of the second cam peak 64 in the normal combustion mode and the premixed combustion mode comprises a cylinder 71 formed in substantially horizontal direction from the right toward the left inside an arm body 70 of the second rocker arm 67, a plunger body 72 mounted slidably from the right inside the cylinder 71, a plunger hole 73 formed at the plunger body 72 concentrically with the cylinder 70 from the left toward the right, and a plunger 74 housed in the plunger hole 73 so as to be slidable from the left. A spring 76 for biasing the plunger body 72 to the right to a pad 75 of the first rocker arm 66 is provided between the plunger body 72 and the arm body 70.

A passage 77 is formed at the plunger 74 for communicating to its left and right, and a needle 79 provided at a piston 78 is inserted into the passage 77. The piston 78 is gently biased toward the right by a spring 80, and a spring chamber 81 for housing the spring 80 communicates with the atmosphere through an air passage 82 formed in the arm body 70. A spherical shut-off valve 83 for blocking an end of the passage 77 is arranged at the right end of the needle 79, pushed to the left by the spring 85 through a retainer 84. The sealed space in the right of the shut-off valve 83 is a locking oil chamber 86, and the sealed space in the left of the shut-off valve 83 is a working oil chamber 87. The working oil chamber 87 communicates with a working oil supply path 89 formed in the arm body 70 through a switching valve 88 comprising a spool valve, and the working oil supply path 89 communicates with an oil path 90 formed inside the rocker shaft 65. Also, the switching valve 88 is arranged across the air passage 82.

When the above-mentioned cancelling mechanism 69 conveys the swing of the second rocker arm 67 to the first rocker arm 66, that is, executes opening of the exhaust valve by means of the second cam peak 64, the control unit 8 supplies the working oil to the oil path 90 by controlling a hydraulic oil volume control valve 91, increasing the oil pressure of the oil path 90 and the working oil supply path 89. Working oil (lubricating oil) of an oil tank 93a is drawn by a pump 93b and supplied to the control valve 91 through an oil gallery 94. When high oil pressure is supplied to the oil path 90, the switching valve 88 regresses to the left against the spring 95 due to the force from the high oil pressure, and the working oil supply path 89 communicates with the working oil chamber 87.

The high-pressure working oil then flows into the working oil chamber 87, the piston 78 moves to the opposite side of the pad 75 against the spring 80, and the plunger body 72 moves to the side of the pad 75. The locking oil chamber 86 is in a sealed state at this time, so the shut-off valve 83 is attracted to open, the working oil in the working oil chamber 87 flows into the locking oil chamber 86, and the plunger body 72 presses against the pad 75 due to the pressure of the working oil. When the plunger body 72 is pressed from the pad 75 with a force larger than that of the pressure of the working oil, the oil pressure of the locking oil chamber 86 rises, and the shut-off valve 83 is pushed and closes, so the locking oil chamber 86 is sealed, and the movement of the plunger body 72 is made to lock.

In this manner, the plunger body 72 is locked when in a pushed out state and touches the pad 75, so the swing of the second rocker arm 67 is conveyed to the first rocker arm 66. Consequently, the exhaust valve is opened not only in the exhaust stroke as normal by means of the first cam peak 63, but also between the latter part of the air inlet stroke and the initial stage of the compression stroke by means of the second cam peak 64. By carrying out this exhaust two-stage valve opening during the premixed combustion mode, it is possible to efficiently prevent knocking with less EGR gas volume (EGR rate) than conventional examples as described above.

When the switching valve 88 moves toward the left so the working oil supply path 89 and the working oil chamber 87 communicate, the spring chamber 81 communicates with the atmosphere through the air passage 82 by means of a ring groove formed along the circumferential direction at the side of the switching valve 88, so transfer of the piston 78 toward the right is allowed without the spring chamber 81 becoming negatively pressurized.

On the other hand, when the swing of the second rocker arm 67 is not conveyed to the first rocker arm 66 by the cancelling mechanism 69, that is, when the opening of the exhaust valve by means of the second cam peak 64 is cancelled, the control valve 91 is narrowed, lowering the pressure of the working oil supplied to the oil path 90. As the oil pressure of the oil path 90 is reduced, the piston 78 moves to the side of the pad 75 due to the biasing force of the spring 80, the needle 79 linked to the piston 78 pushes and opens the shut-off valve 83, and the working oil accumulated in the locking oil chamber 86 returns to the working oil chamber 87. Consequently, when the lock of the plunger body 72 is released and the plunger body 72 is pressed by the pad 75, the plunger body 72 regresses toward the left.

At that time, the pressure of the working oil gradually lowers, but while the force pressing the switching valve 88 is stronger than the biasing force of the spring 95, the oil path 90, the working oil supply path 89, the working oil chamber 87, and the locking oil chamber 86 communicate, so the working oil returns to the oil path 90. When the pressure of the working oil drops further, the switching valve 88 advances due to the biasing force of the spring 95, blocking the working oil chamber 87 and the working oil supply path 89, making both the working oil chamber 87 and the locking oil chamber 86 in a communicating sealed state. As a result, the plunger body 72 is locked in an attracted state. The ring groove formed at the side of the switching valve 88 is displaced from the air passage 82, sealing the spring chamber 81.

In this manner, the plunger body 72 is locked in an attracted state, so the second rocker arm 67 cannot press the pad 75 even if swinged by the second cam peak 64 of the second exhaust cam 62, and swings of the second rocker arm 67 are not conveyed to the first rocking arm 66. Consequently, the exhaust valve opens in the exhaust stroke as normal only by means of the first cam peak 63. By carrying out this valve opening in the normal combustion mode, normal operation can be executed.

Switching between the normal combustion mode and the premixed combustion mode is carried out by the switching means 5 described in the previous embodiment explained using FIG. 2, and, for example, the switching means 5 sets the timing and time of the injection from the fuel injection nozzles 2 to the premixed combustion mode when the air surplus ratio calculated from the air inlet rate measured by the MAF sensor 11 and the fuel injection rate detected by the fuel injection quantity detection means 17 greater than or equal to a predetermined value (2.5, for example) and sets the timing and time of the injection from the fuel injection nozzle 2 to the normal combustion mode when the above-mentioned air surplus ratio is less than the above-mentioned predetermined value.

The present invention is not limited to the embodiments described above, but includes all embodiments within the scope not deviating from the invention described in the claims.

What is claimed is:

1. An exhaust valve control method for a diesel engine for switching between a normal combustion mode and a premixed combustion mode according to operating conditions,
   wherein during the normal combustion mode, an exhaust valve is opened only in an exhaust stroke, and during the premixed combustion mode, the exhaust valve is opened not only in the exhaust stroke but also after the opening of an air inlet valve in an air inlet stroke and before a compression stroke;
   wherein said exhaust valve is opened during the air inlet stroke when an A/F value is more than a predetermined value and a knocking intensity is not greater than a different predetermined value; and
   wherein said exhaust valve is closed during the compression stroke when an exhaust pipe internal pressure is greater than or equal to a cylinder internal pressure.

2. The exhaust valve control method for a diesel engine according to claim 1, wherein the operation is performed in the normal combustion mode during high load operation and the operation is performed in the premixed combustion mode during low and medium load operation.

3. An exhaust valve control device for a diesel engine for switching between a normal combustion mode and a premixed combustion mode according to operating conditions, comprising:
   an exhaust valve drive device capable of changing an opening and closing timing of an exhaust valve; and
   a control unit for controlling said exhaust valve drive device, wherein said control unit controls said exhaust valve drive device so as to open said exhaust valve only in an exhaust stroke during said normal combustion mode, wherein said control unit controls said exhaust valve drive device so as to open said exhaust valve not only in the exhaust stroke, but also after the opening of an air inlet valve in an air inlet stroke and before a compression stroke during said premixed combustion mode, wherein the exhaust valve control device further comprises an MAF sensor for measuring an air inlet rate, a knocking sensor for measuring the intensity of knocking, injection quantity detection means for detecting a fuel injection quantity, an exhaust pipe internal pressure sensor for measuring an exhaust pipe internal pressure, and cylinder internal pressure detection means for detecting a cylinder internal pressure, wherein said control unit determines a valve opening timing of said exhaust valve in the air inlet stroke based on conditions that an A/F value calculated from the air inlet rate measured by said MAF sensor and the fuel injection quantity detected by said fuel injection quantity detection means is more than a predetermined value and the knocking intensity measured by said knocking sensor is not greater than a different predetermined value, and wherein said control unit determines a valve closing timing of said exhaust valve in the compression stroke based on condition that the exhaust pipe internal pressure measured by said exhaust pipe internal pressure sensor is higher than the cylinder internal pressure detected by said cylinder internal pressure detection means.

4. The exhaust valve control device for a diesel engine according to claim 3, wherein said exhaust valve drive device is a camless valve drive device not having a mechanical cam and comprises biasing means for biasing said exhaust valve in a closing direction, a pressure chamber to which a working fluid pressurized to open said exhaust valve against an biasing force of said biasing means is supplied, supply means for supplying said working fluid into said pressure chamber, and discharge means for discharging said working fluid from inside said pressure chamber, and said control unit controls supply timing of said working fluid into said pressure chamber by means of said supply means, and controls discharge timing of said working fluid from said pressure chamber by means of said discharge means.

5. The exhaust valve control device for a diesel engine according to claim 3, wherein said cylinder internal pressure detection means has a crank angle sensor for detecting an angle of a crankshaft and an air inlet pipe internal pressure sensor for measuring an internal pressure of an air inlet pipe, and calculates a cylinder internal pressure at each of the crank angles based on at least the air inlet pipe internal pressure measured by said air inlet pipe internal pressure sensor.

6. The exhaust valve control device for a diesel engine according to claim 3, comprising switching means for carrying out operation in the premixed combustion mode when an air surplus ratio calculated from air inlet rate measured by said MAF sensor and the fuel injection quantity detected by said fuel injection quantity detection means is more than or equal to a predetermined value, and switching to operation in the normal combustion mode when said air surplus ratio is less than said predetermined value.

7. The exhaust valve control device for a diesel engine according to claim 3, wherein said exhaust valve drive device is an exhaust two-stage cam switching device and comprises a first cam peak formed at an exhaust cam rotated by a crankshaft so as to open said exhaust valve in an exhaust stroke, a second cam peak formed at said exhaust cam so as to open said exhaust valve between an air inlet stroke and a compression stroke, and a cancelling mechanism for cancelling opening of said exhaust valve by means of said second cam peak, and said control unit makes said cancelling mechanism operate during operation in said normal combustion mode to stop the opening of said exhaust valve by means of said second cam peak, and suspends said cancelling mechanism during operation in said premixed combustion mode to execute the opening of said exhaust valve by means of said second cam peak.

8. The exhaust valve control device for a diesel engine according to claim 7, further comprising an MAF sensor for measuring the air inlet rate and injection quantity detection means for detecting the fuel injection quantity, and comprises switching means for carrying out operation in the premixed combustion mode when an air surplus ratio calculated from an air inlet rate measured by said MAF sensor and a fuel injection quantity detected by said fuel injection quantity detection means is more than or equal to a predetermined value, and for switching to operation in the normal combustion mode when said air surplus ratio is less than said predetermined value.

* * * * *